(12) United States Patent
Horikawa et al.

(10) Patent No.: US 12,424,635 B2
(45) Date of Patent: Sep. 23, 2025

(54) SECONDARY BATTERY CURRENT COLLECTOR AND MANUFACTURING METHOD FOR SAME, AND SECONDARY BATTERY

(71) Applicant: Prime Planet Energy & Solutions, Inc., Tokyo (JP)

(72) Inventors: Daisuke Horikawa, Kariya (JP); Yohei Shindo, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 730 days.

(21) Appl. No.: 17/743,368

(22) Filed: May 12, 2022

(65) Prior Publication Data
US 2022/0367880 A1    Nov. 17, 2022

(30) Foreign Application Priority Data

May 13, 2021    (JP) ................................. 2021-081708

(51) Int. Cl.
*H01M 4/66*    (2006.01)
*H01M 10/0525*    (2010.01)

(52) U.S. Cl.
CPC ........... *H01M 4/668* (2013.01); *H01M 4/667* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2009/0017376 A1* | 1/2009 | Yamamura | ............ | H01M 4/668 |
| | | | | 429/209 |
| 2010/0119940 A1 | 5/2010 | Okano et al. | | |
| 2018/0358608 A1 | 12/2018 | Mino | | |
| 2019/0140311 A1 | 5/2019 | Hasegawa et al. | | |
| 2022/0344670 A1* | 10/2022 | Shindo | .................. | H01M 4/661 |
| 2022/0344671 A1* | 10/2022 | Horikawa | ........... | H01M 50/474 |

FOREIGN PATENT DOCUMENTS

| | | | | |
|---|---|---|---|---|
| CN | 103219521 A | * | 7/2013 | |
| CN | 108475756 A | | 8/2018 | |
| CN | 112201792 A | | 1/2021 | |
| CN | 112397722 A | | 2/2021 | |
| JP | 2007-26913 A | | 2/2007 | |
| JP | 2012-155974 A | | 8/2012 | |
| JP | 2019-033066 A | | 2/2019 | |
| JP | 2020-087918 A | | 6/2020 | |
| JP | 2020-126803 A | | 8/2020 | |
| KR | 1020060061282 A | | 6/2006 | |
| WO | 2012/102220 A1 | | 8/2012 | |
| WO | 2012/118127 A1 | | 9/2012 | |
| WO | WO-2015005116 A1 | * | 1/2015 | ............ C08F 255/02 |
| WO | WO-2019031091 A1 | * | 2/2019 | ............. H01G 11/68 |

OTHER PUBLICATIONS

Machine translation of CN 103219521 A, published on Jul. 24, 2013 (Year: 2013).*
Machine translation of WO 2015/005116, published on Jan. 15, 2015 (Year: 2015).*
Machine translation of WO 2019/031091, published on Feb. 14, 2019 (Year: 2019).*
Laminate Definition & Meaning, available online at https://www.merriam-webster.com/dictionary/laminate, date unknown.*

* cited by examiner

*Primary Examiner* — Anca Eoff
(74) *Attorney, Agent, or Firm* — HAUPTMAN HAM, LLP

(57) ABSTRACT

The secondary battery current collector disclosed herein includes a resin layer, a first metal layer covering one main surface of the resin layer, and a second metal layer covering the other main surface of the resin layer. Each of the first metal layer and the second metal layer extend beyond an external side of the main surface of the resin layer. The secondary battery current collector has a resin-laminated part, in which the first metal layer, the resin layer, and the second metal layer are laminated; and a metal-laminated part, in which the first metal layer and the second metal layer are overlaid, on an external side of the resin-laminated part. A thickness of the metal-laminated part is greater than a total thickness of the first metal layer and the second metal layer in the thickest portion of the resin-laminated part.

2 Claims, 3 Drawing Sheets

SECONDARY BATTERY CURRENT COLLECTOR AND MANUFACTURING METHOD FOR SAME, AND SECONDARY BATTERY

BACKGROUND OF THE INVENTION

1. Field of the Invention

The present disclosure relates to a secondary battery current collector and a manufacturing method for same. The present disclosure also relates to a secondary battery that uses the secondary battery current collector. This application claims priority based on Japanese Patent Application No 2021-081708, filed on May 13, 2021, the entire contents of which are incorporated herein by reference.

2. Description of the Related Art

In recent years, secondary batteries such as lithium ion secondary batteries have been used suitably as portable power sources for personal computers, portable terminals, and the like, and as drive power sources for vehicles such as battery electric vehicles (BEV), hybrid electric vehicles (HEV), and plug-in hybrid electric vehicles (PHEV).

In general, a secondary battery uses an electrode constituted such that an active material layer containing an active material is provided on a current collector. When the active material occludes ions that carry charge, its volume increase occurs. It is known that volume changes in the active material associated with electric charging and discharging result in pealing of the active material layer from the current collector, electrode deformation, and the like, which can result in deterioration of the cycle characteristics of the secondary battery.

In Japanese Patent Application Laid-Open No. 2007-26913, in order to suppress the electrode deformation due to the volume change in the abovementioned active material, laminated metal foil for use in a lithium ion secondary battery has been proposed, in which metal foil with a roughened surface is laminated, and in which resin is placed in gaps between the metal foil.

SUMMARY OF THE INVENTION

However, as a result of diligent examination, the present inventors have found that the abovementioned conventional art leaves room for improvement of the cycle characteristics. In addition, in relation to the secondary battery, there is a desire for suppression of the temperature increase that occurs when an internal short circuit occurs. In relation to the abovementioned conventional art, it has been found that there is room for improvement in suppression of temperature increase when an internal short circuit occurs (that is, in internal short circuit resistance).

An object of the present disclosure is to provide a current collector that can impart excellent cycle characteristics and internal short circuit resistance to a secondary battery.

The secondary battery current collector disclosed herein includes a resin layer, a first metal layer covering one main surface of the resin layer, and a second metal layer covering the other main surface of the resin layer. Each of the first metal layer and the second metal layer extends beyond an external side of the main surface of the resin layer. The secondary battery current collector has a resin-laminated part, in which the first metal layer, the resin layer, and the second metal layer are laminated, and a metal-laminated part, in which the first metal layer and the second metal layer are overlaid, on an external side of the resin-laminated part. A thickness of the metal-laminated part is greater than a total thickness of the first metal layer and second metal layer in the thickest portion of the resin-laminated part. By such a constitution, a current collector is provided that can impart excellent cycle characteristics and internal short circuit resistance to a secondary battery.

In a desired embodiment of the secondary battery current collector disclosed herein, the resin layer contains particles of the same metal as metal which constitutes at least one of the first metal layer and the second metal layer. By such a constitution, a secondary battery can be given a high power output at low temperature.

In a desired embodiment of the secondary battery current collector disclosed herein, the total thickness of the first metal layer and the second metal layer in the thickest portion of the resin-laminated part is no more than 3 μm. By such a constitution, heat generation at the time of an internal short circuit of a secondary battery can be suppressed further.

The secondary battery current collector disclosed herein can be manufactured suitably by a method including the steps of preparing a resin sheet and two sheets of metal foil; sandwiching the resin sheet between the two sheets of metal foil, and placing metal particles between the two sheets of metal foil at end parts of the two sheets of metal foil; and performing resistance-welding of the two sheets of metal foil in a portion where the metal particles are placed.

In the manufacturing method, the resin sheet contains the metal particles, and in the step of placing the metal particles, placement of the metal particles may be implemented by sandwiching the resin sheet between the two sheets of metal foil.

From another aspect, the secondary battery disclosed herein includes an electrode including the above-described current collector, and an electrolyte. By such a constitution, a secondary battery that has excellent cycle characteristics and internal short circuit resistance can be provided.

DESCRIPTION OF IRE PREFERRED EMBODIMENTS

Figure 1:
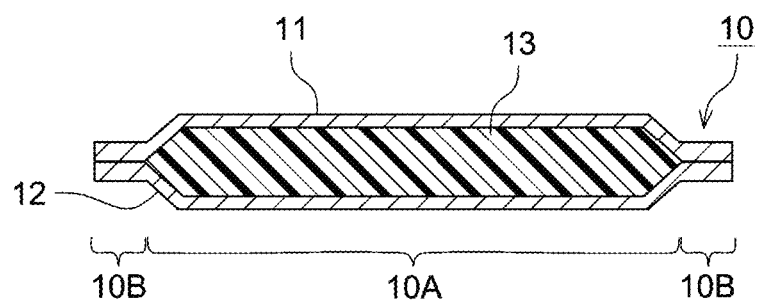
FIG. 1 is a cross-sectional view schematically showing the secondary battery current collector according to one embodiment of the present disclosure.

Hereinafter, an embodiment according to the present disclosure will be described with reference to the drawings. Matters not mentioned in the present description and necessary for carrying out the present disclosure can be ascertained as design matters by a person skilled in the art based on the related art in the pertinent field. The present disclosure can be carried out based on the contents disclosed in the present description and general technical knowledge in the art. Further, in the following drawings, members/parts having the same action are represented by the same reference numerals for explanation. Further, the dimensional relations (length, width, thickness, and the like) in each drawing do not reflect the actual dimensional relations.

In the present description, the term "secondary battery" refers to a power storage device that can be charged and discharged repeatedly, and is a term inclusive of a so-called storage battery and a power storage element such as an electric double layer capacitor. Further, in the present specification, the "lithium ion secondary battery" refers to a secondary battery that uses lithium ions as charge carriers and realizes charge/discharge by the transfer of charges accompanying the lithium ions between the positive and negative electrodes.

A cross-section of one example of the secondary battery current collector according to the present embodiment is shown schematically in FIG. 1. As shown in FIG. 1, a secondary battery current collector 10 in the present embodiment includes a resin layer 13, a first metal layer 11, and a second metal layer 12.

The resin layer 13 contributes to suppression of heat generation when an internal short circuit occurs in the secondary battery. Specifically, when the secondary battery generates heat due to an internal short circuit, the resin layer 13 causes volume changes by melting, thermal decomposition, and the like, ruptures the first metal layer 11 and the second metal layer 12, and as a result can interrupt the electric current. The fusion temperature of copper foil, which is generally used as a current collector, is approximately 1100° C., and the fusion temperature of aluminum foil, which is generally used as a current collector, is approximately 660° C. Since the temperature that induces volume changes in resin is lower than 660° C., use of the resin layer 13 enables fusion of the current collector 10 (that is, interruption of the electric current) at a much lower temperature than fusion of the aluminum foil and copper foil that are current collectors generally used, and also enables marked suppression of heat generation when an internal short circuit occurs in the secondary battery.

For the resin that constitutes the resin layer 13, a resin with an appropriate melting point and/or thermal decomposition temperature may be selected as appropriate, depending upon the temperatures at which the first metal layer 11 and the second metal layer 12 are to be ruptured. It is desired for the resin layer 13 to induce volume changes by melting, thus rupturing the first metal layer 11 and the second metal layer 12. Therefore, thermoplastic resin is desired as the resin that constitutes the resin layer 13. As the melting point of resin constituting the resin layer 13, 250° C. or lower is desired, 200° C. or lower is more desired, and 150° C. or lower is still more desired. In addition, it is desired for the melting point of the resin constituting the resin layer 13 to be at least 80° C.

Polyethylene (PE) is particularly desired as the resin constituting the resin layer 13. Polyethylene has appropriate melting points to achieve the abovementioned electric current interruption (for example, 95° C. to 130° C. for low-density polyethylene, and 120° C. to 140° C. for high-density polyethylene). In addition, polyethylene performs a shutdown function (the function in which when an internal short circuit occurs in the secondary battery, heat generation occurs, and polyethylene melts, blocks fine pores in separators and prevents ion permeation, thus interrupting the electric current), and polyethylene is therefore generally used for separators in secondary batteries. When the resin that constitutes the resin layer 13 is polyethylene, the shutdown function of the separators, and electric current interruption due to rupture of the first metal layer 11 and the second metal layer 12 in the current collector 10 can be put into operation simultaneously, enabling more effective suppression of temperature increase when an internal short circuit occurs in the secondary battery.

The resin layer 13 may contain metal particles. It is desired for the metal particles to be particles of the same metal as that which constitutes at least one of the first metal layer 11 and the second metal layer 12. When the resin layer 13 contains metal particles, the electron conductivity of the resin layer 13 increases, as a result of which the low-temperature resistance decreases, enabling the secondary battery to have high power output at low temperature.

The thickness of the resin layer 13 is not particularly limited as long as the abovementioned rupture is possible, and the thickness can be set as appropriate to the resin type, current collector design, secondary battery design, and the like. The thickness of the resin layer 13 is desired to be at least 5 μm and no more than 60 μm.

The metals that constitute the first metal layer 11 and the second metal layer 12 may be the same as metals used for publicly known secondary battery current collectors. Specific examples of the metal that can be mentioned are aluminum, aluminum alloys, copper, copper alloys, nickel, titanium, stainless steel, and the like. When the current collector 10 is a positive electrode current collector, the desired constituent metal of the current collector is aluminum or an aluminum alloy. When the current collector 10 is a negative electrode current collector, the desired constituent metal of the current collector is copper or a copper alloy. The metal constituting the first metal layer 11 may be the same as or different from the metal constituting the second metal layer 12, but it is desired for the metals constituting these metal layers to be the same.

The dimensions of the main surface of the first metal layer 11 (that is, the surface with the greatest surface area) are greater than the dimensions of the main surface of the resin layer 13. The first metal layer 11 covers one of the main surfaces of the resin layer 13 (in FIG. 1, the main surface of the upper side of the resin layer 13), and extends beyond the external side of the main surface of the resin layer 13. Similarly, the dimensions of the main surface of the second metal layer 12 are greater than the dimensions of the main surface of resin layer 13. The second metal layer 12 covers the main surface of the other side of the resin layer 13 (in FIG. 1, the main surface of the lower side of the resin layer 13), and extends beyond the external side of the main surface of the resin layer 13. The first metal layer 11 and the second metal layer 12 are overlaid directly, in the portion where the metal layers extend as described.

As shown in FIG. 1, the current collector 10 includes a resin-laminated part 10A, in which the first metal layer 11, the resin layer 13, and the second metal layer 12 are laminated. In addition, on each external side of the resin-laminated part 10A, there are metal-laminated parts 10B, in which the first metal layer and second metal layer are overlaid.

In the metal-laminated parts 10B, the first metal layer 11 and the second metal layer 12 may be joined or not joined, but it is desired for the metal layers to be joined. The method for joining the first metal layer 11 and the second metal layer 12 is not particularly limited, but welding can be mentioned as an example. The welding may be resistance welding, laser welding, ultrasonic welding, or the like, and resistance welding is desired.

In the illustrated example, the resin-laminated part 10A has a flat central portion with a uniform thickness, and end portions in which the thickness decreases. However, the configuration of the resin-laminated part 10A is not limited thereto. For example, the resin-laminated part 10A may be elliptical in cross-section. In the illustrated example, the flat portion of the resin-laminated part 10A is the thickest portion of the resin-laminated part 10A. When the resin-laminated part 10A is elliptical in cross-section, the short-axis portion of the relevant ellipse is the thickest portion of the resin-laminated part 10A.

In the present embodiment, the thickness of the metal-laminated parts 10B is greater than the total thickness of the first metal layer 11 and the second metal layer 12 in the thickest portion of the resin-laminated part 10A. It is sufficient for the thickness of only one of the two of the metal-laminated parts 10B to be greater than e total thickness, but it is desired for the thickness of each of the metal-laminated parts 10B to be greater than the total thickness.

In the conventional art for placement of resin in a space between metal foil sheets, no consideration is given to the thickness of the metal-laminated part, and the thickness of the metal-laminated part is therefore the same as the total thickness of the two sheets of metal foil in the resin-laminated part, or, when the two sheets of metal foil are joined by resistance welding or the like, the thickness of the metal-laminated part is reduced by the joining operation. Therefore, in the conventional art, when the secondary battery undergoes repeated electric charging and discharging, the metal-laminated part is subjected to stress by expansion and/or contraction of the active material, and the stress causes rupture of the metal-laminated part, leading to decrease in capacity. The metal-laminated part is a part of a current collector that is particularly readily subjected to stress.

In contrast with the conventional art, in the present embodiment, the thickness of the metal-laminated part 10B is increased to exceed the total thickness of the first metal layer 11 and the second metal layer 12 in the thickest portion of the resin-laminated part 10A, and thereby the strength of the metal-laminated part 10B, which is readily subject to stress due to change in the volume of the active material, is increased. As a result, it is possible to suppress rupture of the abovementioned metal-laminated part when the secondary battery undergoes repeated electric charging and discharging, and thereby to improve the cycle characteristics of the secondary battery. In addition, the present embodiment makes the current collector 10 less susceptible to corrosion, which is also considered to contribute to improvement of the cycle characteristics of the secondary battery.

The thickness of the metal-laminated part 10B is not particularly limited, as long as the thickness is greater than the total thickness of the first metal layer 11 and the second metal layer 12 in the thickest portion of the resin-laminated part 10A. The thickness of the metal-laminated part 10B may be, for example, at least 0.5 µm, is desired to be at least 3 µm, is more desired to be at least 4.5 µm, and is still more desired to be at least 5.0 µm. On the other hand, the thickness of the metal-laminated part 10B may be, for example, 15 µm or less, is desired to be 12 µm or less, is more desired to be 10 µm or less, and is still more desired to be 7.5 µm or less.

The total thickness of the first metal layer 11 and the second metal layer 12 in the thickest portion of the resin-laminated part 10A may be, for example, 8 µm or less, is desired to be 6 µm or less, is more desired to be 5 µm or less, and is still more desired to be 3 µm or less. When the total thickness is 3 µm or less, heat generation when an internal short circuit occurs in the secondary battery can be suppressed more. The total thickness is desired to be at least 0.3 µm, is more desired to be at least 0.5 µm and is still more desired to be at least 1.0 µm.

The method for increasing the thickness of the metal-laminated part 10B to greater than the total thickness of the first metal layer 11 and the second metal layer 12 in the thickest portion of the resin-laminated part 10A is not particularly limited. One method that can be mentioned is use of metal foil having partially differing thickness as the first metal layer 11 and the second metal layer 12. Another method that can be mentioned is placing metal particles in the overlaid portions of two metal sheets, and thus adjusting the thickness of the metal-laminated part 10B by the quantity of metal particles, when manufacturing the current collector.

The ratio of the thickness of the metal-laminated part 10B to the total thickness of the first metal layer 11 and the second metal layer 12 in the thickest portion of the resin-laminated part 10A is not particularly limited. The ratio may be, for example, at least 1.1, and is desired to be at least 2. In addition, the ratio may be, for example, 10 or less.

In the present embodiment, the current collector 10 can be manufactured suitably by the following method. Hereinafter, the manufacturing method is described, but the current collector 10 in the present embodiment is not limited to one manufactured by the following method.

The manufacturing method includes steps of preparing a resin sheet and two sheets of metal foil (preparation step); sandwiching the resin sheet between the two sheets of metal foil, placing metal particles between two sheets of metal foil at end parts of the two sheets of metal foil (metal particle placement step); and performing resistance-welding of the two sheets of metal foil (resistance-welding step).

The resin sheet corresponds to the abovementioned resin layer 13, and the two sheets of metal foil correspond to the abovementioned first metal layer 11 and second metal layer 12. Two typical embodiments of the manufacturing method are described below First Embodiment of Manufacturing Method In the first embodiment, a resin sheet and two sheets of metal foil are prepared in the preparation step. At that time, as the two sheets of metal foil, metal foil is prepared that has a larger dimension, at least in the width direction (that is, the short-side direction of the main surface of the metal foil), than the resin sheet, so as to enable implementation of metal particle placement step.

In the metal particle placement step, a resin sheet is sandwiched between two sheets of metal foil. The sandwiching is performed in such a manner that the two sheets of metal foil extend beyond the external side of the width direction of the resin sheet (that is, the short-side direction of the main surface of the resin sheet). In this manner, metal foil sheets are mutually overlaid at the end part of the two sheets of metal foil to form a laminated body.

In order to achieve adhesion between the metal foil and the resin sheet, it is desired for hot-press treatment of the laminated body to be performed.

Metal particles are placed in the portion of the laminated body in which metal foils are mutually overlaid. At that time, when a paste containing metal particles and resin components is used, placement of metal particles can be achieved readily. Specifically, by applying the paste between the metal foil sheets (over at least one sheet of metal foil), placement of the metal particles can be achieved readily.

The metal that constitutes the metal particles is not particularly limited, but it is desired for the metal to be the same as the metal constituting the metal foil. The resin components of the paste are not particularly limited, but substances used as binding agents in the active material layers in the electrodes of secondary batteries can be used suitably, and examples of such that can be mentioned are polyvinylidene difluoride (PVDF), polyvinyl alcohol (PVA), styrene-butadiene rubber (SBR), and the like.

Next, the resistance-welding step is performed. The resistance-welding step can be performed in accordance with a publicly known resistance welding method for joining metal foil sheets, and welding is performed in the portion where metal particles are placed. It should be noted that after welding, some of the resin components of the paste may remain at the welded part.

A secondary battery current collector can be obtained in the manner described above. In the portion where the metal foils are mutually overlaid, by adding the metal particles it is possible to increase the thickness to greater than the thickness of the two sheets of metal foil. The thickness can also be adjusted by the quantity of the metal particles added.

Second Embodiment of Manufacturing Method

In the preparation step in the second embodiment, a resin sheet containing metal particles, and two sheets of metal foil are prepared. In the second embodiment, the two sheets of metal foil may have the same dimensions as the resin sheet. It is desired for the metal particles contained in the resin sheet to be particles of the same metal as the metal that constitutes the metal foil.

In the metal particle placement step, the resin sheet is sandwiched between the two sheets of metal foil. As a result, the metal particles contained in the resin sheet are placed between the two sheets of metal foil at the end part of the two sheets of metal foil. In order to achieve adhesion between the metal foil and the resin sheet, it is desired for hot-press treatment to be performed with the laminated body.

Next, the resistance-welding step is performed. The resistance-welding step can be performed in accordance with a publicly known method for resistance welding in which metal foil sheets are joined, and welding is performed at the end part of the laminated body. It should be noted that after welding, some of the resin components of the paste resin sheet may remain at the welded part.

A secondary battery current collector can be obtained as described above. In the portion where the metal foils are mutually overlaid, addition of metal particles can increase the thickness to greater than the thickness of two sheets of metal foil. The thickness can also be adjusted by quantity of metal particles added.

According to the current collector 10 in the present embodiment, it is possible to impart excellent cycle characteristics and internal short circuit resistance to the secondary battery. In addition, according to the present embodiment, since the metal-laminated part 10B in the current collector 10 has high strength, it is possible to suppress rupture of the current collector 10 when the current collector 10 and current collector terminals are joined at the time of manufacturing the secondary battery. In addition, according to the present embodiment, it is possible to suppress rupture of the current collector 10 at the time of use of the secondary battery.

In the present embodiment, the current collector 10 can be used in the secondary battery (particularly, the current collector of the electrode of the secondary battery) in accordance with the publicly known method. The current collector 10 can be used, particularly as the current collector of the electrode of the secondary battery.

Figure 2:
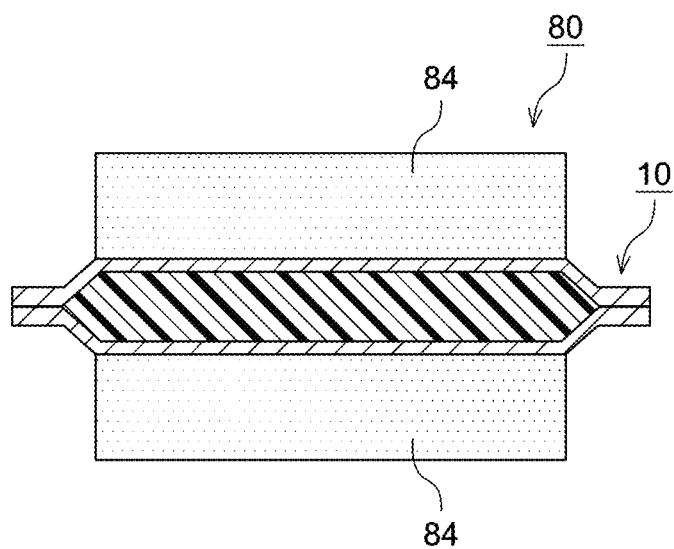
FIG. 2 is a cross-sectional view schematically showing an electrode that uses the secondary battery current collector according to one embodiment of the present disclosure.

FIG. 2 schematically shows an electrode 80, which uses the current collector 10. In the example shown in FIG. 2, in the electrode 80, an active material layer 84 is formed on both surfaces of the current collector 10. However, the active material layer 84 may be formed on one surface only of the current collector 10. As in the example shown in FIG. 2, it is desired for the active material layer 84 to be formed over the resin-laminated part 10A.

When the active material layer 84 is a positive electrode active material layer, the positive electrode active material layer contains positive electrode active material. Examples of the positive electrode active material that can be mentioned are lithium transition metal composite oxides such as lithium nickel cobalt manganese composite oxides (for example, $LiNi_{1/3}Co_{1/3}Mn_{1/3}O_2$ and the like), lithium nickel composite oxides (for example, $LiNiO_2$ and the like), lithium cobalt composite oxides (for example, $LiCoO_2$ and the like), and lithium nickel manganese composite oxides (for example, $LiNi_{0.5}Mn_{1.5}O_4$ and the like). The positive electrode active material layer may also contain conductive materials, binding agents, and the like. Examples of conductive materials that may be used are carbon black such as acetylene black (AB) and other carbon materials (for example, graphite and the like). Examples of binding agents that may be used are PVDF and the like.

When the active material layer 84 is a negative electrode active material layer, the negative electrode active material layer contains negative electrode active material. Examples of the negative electrode active material that can be mentioned are carbon-based negative electrode active materials such as graphite, hard carbon, and soft carbon; silicon-based negative electrode active materials such as silicon, silicon oxides, silicon carbide, and silicon nitride; and tin-based negative electrode active materials such as tin, tin oxides, tin nitrides, and tin-containing alloys. The negative electrode active material layer may also include binding agents, thickening agents, and the like. As binding agents, for example, SBR and the like may be used. As thickening agents, for example, carboxymethylcellulose (CMC) and the like may be used.

The thickness of the active material layer 84 is not particularly limited, and may be, for example, 20 μm to 300 μm.

In the present embodiment, the capacity decrease that occurs upon repeated electric charging and discharging of the secondary battery including the current collector 10 is suppressed. As a result, the secondary battery has excellent cycle characteristics. In addition, heat generation that occurs when an internal short circuit (particularly an unusually large internal short circuit such that metal components penetrate the electrode body) occurs in the secondary battery is suppressed. As a result, the secondary battery has excellent internal short circuit resistance.

From another aspect, the secondary battery disclosed herein includes an electrolyte, and an electrode that includes the abovementioned secondary battery current collector. The secondary battery is described below, with a lithium ion secondary battery 100 as an example. However, the secondary battery disclosed herein is not limited to the lithium ion secondary battery 100 described below.

Figure 3:
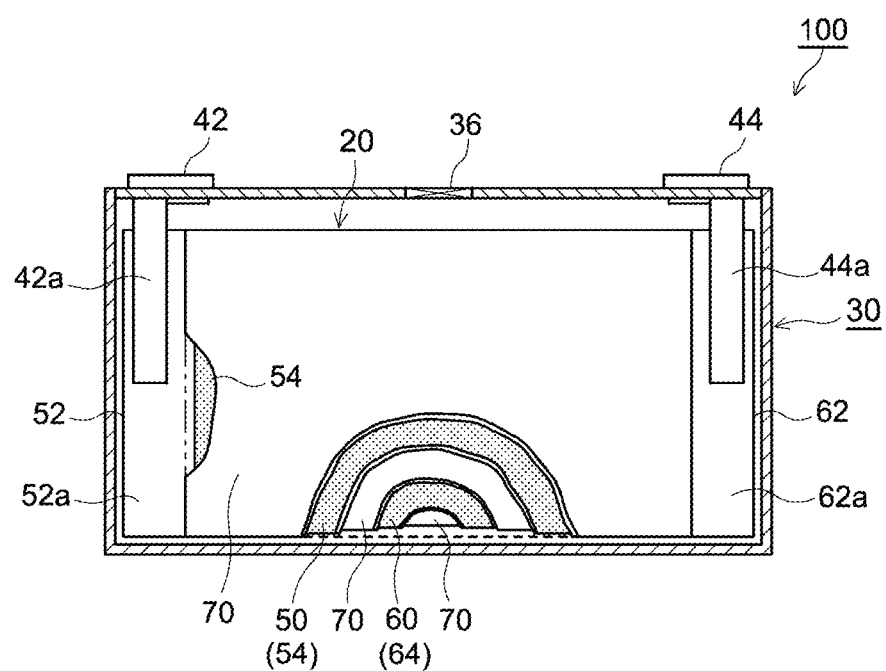
FIG. 3 is a cross-sectional view schematically showing the internal construction of a lithium ion secondary battery that uses the current collector according to one embodiment of the present disclosure.

The lithium ion secondary battery 100 shown in FIG. 3 is a sealed battery constructed by accommodating a flat wound electrode body 20 and a non-aqueous electrolyte (not shown) in a flat square battery case (that is, an outer container) 30. The battery case 30 is provided with a positive electrode terminal 42 and a negative electrode terminal 44 for external connection, and a thin-walled safety valve 36 set to release an internal pressure of the battery case 30 when the internal pressure increases to a prescribed level, or higher. The positive electrode terminal 42 and the negative electrode terminal 44 are electrically connected to a positive electrode current collecting plate 42a and a negative electrode current collecting plate 44a. As the material of the battery case 30, for example, a lightweight metal material having good thermal conductivity such as aluminum is used.

Figure 4:
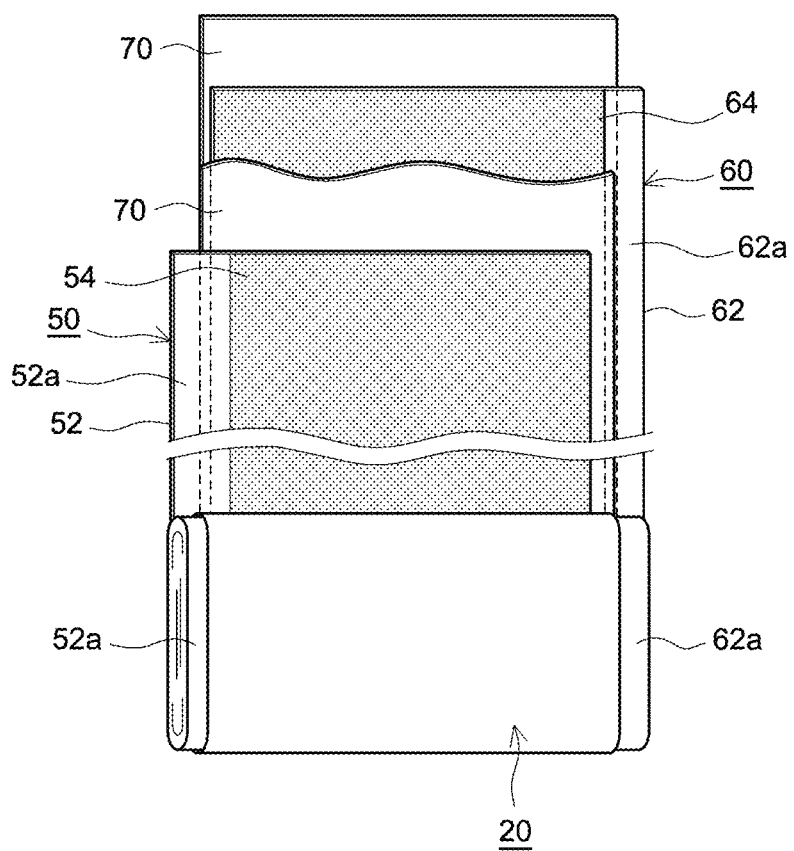
FIG. 4 is a schematic diagram showing the constitution of the wound electrode body in the lithium ion secondary battery shown in FIG. 3.

As shown in FIGS. 3 and 4, the wound electrode body 20 has a configuration in which a positive electrode sheet 50 and a negative electrode sheet 60 are overlapped with each other, with two long separator sheets 70 being interposed therebetween, and are wound in the longitudinal direction. The positive electrode sheet 50 has a configuration in which a positive electrode active material layer 54 is formed along the longitudinal direction on one side or both sides (here, both sides) of a long positive electrode current collector 52. The negative electrode sheet 60 has a configuration in which a negative electrode active material layer 64 is formed along the longitudinal direction on one side or both sides (here, both sides) of a long negative electrode current collector 62. A positive electrode active material layer non-formation portion 52a (that is, a portion where the positive electrode active material layer 54 is not formed and the positive electrode current collector 52 is exposed) and a negative electrode active material layer non-formation portion 62a (that is, a portion where the negative electrode active material layer 64 is not formed and the negative electrode current collector 62 is exposed) are formed so as to protrude outward from both ends of the wound electrode body 20 in the winding axis direction (that is, the sheet width direction orthogonal to the longitudinal direction). The positive electrode current collecting plate 42a and the negative electrode current collecting plate 44a are joined to the positive electrode active material layer non-formation portion 52a and the negative electrode active material layer non-formation portion 62a, respectively.

For at least one of the positive electrode sheet 50 and the negative electrode sheet 60, the abovementioned electrode 80 is used. Therefore, for at least one of the positive electrode current collector 52 of the positive electrode sheet 50 and the negative electrode current collector 62 of the negative electrode sheet 60, the abovementioned current collector 10 is used.

When the above-mentioned electrode 80 is used for only one of the positive electrode sheet 50 and the negative electrode sheet 60, the constitution of the electrode of the one of the sheets for which the electrode 80 is not used may be the same as in conventional lithium ion secondary batteries. When the electrode for which the electrode 80 is not used is the positive electrode 50, the positive electrode current collector 52 may be, for example, aluminum foil or the like. When the electrode for which the electrode 80 is not used is the negative electrode 60, the negative electrode current collector 62 may be, for example, copper foil or the like. In the case of the positive electrode 50 and the negative electrode 60 for which the electrode 80 is not used, the positive electrode active material layer 54 and the negative electrode active material layer 64 may be the same as the above-mentioned active material layer 84.

As the separator 70, various types of microporous sheets similar to those conventionally used in lithium ion secondary batteries can be used, and an example that can be mentioned is microporous resin sheet made of a resin such as polyethylene (PE), and polypropylene (PP). Such a porous sheet may have a single-layer structure or a laminated structure of two or more layers (for example, a three-layer structure in which PP layers are laminated on both sides of a PE layer). It is preferred for the separator 70 to include a porous PE layer. A heat-resistant layer (HRL) may be provided on the surface of the separator 70.

The same non-aqueous electrolyte solution as in conventional lithium ion secondary batteries can be used, and typically a solution in which a supporting salt is contained in an organic solvent (non-aqueous solvent) can be used. As the non-aqueous solvent, various types of organic solvents such as carbonates, ethers, esters, nitriles, sulfones, and lactones, that are used in electrolyte solutions in general lithium ion secondary batteries can be used, without particular limitation. Specific examples of such non-aqueous solvents are ethylene carbonate (EC), propylene carbonate (PC), diethyl carbonate (DEC), dimethyl carbonate (DMC), ethyl methyl carbonate (EMC), and the like. A single type of the non-aqueous solvents described above can be used, or two or more of the types can be combined as appropriate and used. As the supporting salt, for example, a lithium salt (desirably $LiPF_6$) such as $LiPF_6$, $LiBF_4$, and $LiClO_4$ (desirably $LiPF_6$) can be used suitably. The desired concentration of the supporting salt is at least 0.7 mol/L and no higher than 1.3 mol/L.

The above-mentioned non-aqueous electrolyte solution may contain various types of additives, for example, gas-generating agents such as biphenyl (BP), and cyclohexylbenzene (CHB); film-forming agents such as oxalate complex compounds containing boron atoms and/or lithium atoms, and vinylene carbonate (VC); dispersing agents; thickening agents, and the like, insofar as the additives do not markedly impair the advantageous effect of the present disclosure.

The lithium ion secondary battery 100 can be used for various applications. As suitable applications, drive power sources that are mounted on vehicles such as a battery electric vehicle (BEV), a hybrid electric vehicle (HEV), and a plug-in hybrid electric vehicle (PHEV) can be mentioned. In addition, the lithium ion secondary battery 100 can be used as a storage battery for a small electric power storage device, and the like. The lithium ion secondary battery 100 can also be used in a form of a battery pack which typically consists of a plurality of batteries connected in series and/or in parallel.

It should be noted that an angular lithium ion secondary battery 100 provided with a flat wound electrode body 20 has been described by way of an example. However, the lithium ion secondary battery can also be constituted as a lithium ion secondary battery provided with a stacked-type electrode body (that is, an electrode body in which a plurality of positive electrodes and a plurality of negative electrodes are alternately laminated). In addition, the lithium ion secondary battery can be constituted as a cylindrical lithium ion secondary battery, a laminate-cased lithium ion secondary battery, or the like. In addition, the lithium ion secondary battery can be constituted as an all-solid-state lithium ion secondary battery, using a solid electrolyte instead of a non-aqueous electrolyte solution in accordance with a publicly known method. In addition, using the abovementioned current collector, a secondary battery other than a lithium ion secondary battery can be constituted in accordance with a publicly known method.

Hereinafter, examples relating to the present disclosure will be described, but the present disclosure is not intended to be limited to matters shown in such examples.

Examples 1 to 8

A resin sheet composed of polyethylene with a thickness of 20 μm was prepared. In addition, two sheets of copper foil with dimensions greater than the resin sheet were prepared. The resin sheet was sandwiched between two sheets of copper foil so that the end part of the copper foil extended beyond the edge of the resin sheet, and adhesion of the resin sheet and copper foil was achieved by hot-press treatment. A paste in which copper particles and PVDF were mixed was applied between the end parts of the two sheets of copper foil that extended from the edge of the resin sheet to the external side, and the end parts of the two sheets of copper foil were again overlaid. The end parts of the two sheets of copper foil to which the paste had been applied were then resistance-welded, and the current collector of Example 1 was obtained.

Examples 2 to 8

The current collectors of Examples 2 to 8 were obtained in a manner similar to Example 1, except that the thickness of application of the paste in which copper particles and PVDF were mixed was changed within the range from 1 μm to 10 μm to change the thickness of the metal-laminated part.

Example 9

A resin sheet containing copper particles was prepared. In addition, two sheets of copper foil with the same dimensions as the resin sheet were prepared. The resin sheet was sandwiched between two sheets of copper foil, and adhesion between the resin sheet and copper foil was achieved by hot-pressing. Resistance-welding of the end part of the copper foil was then performed, and the current collector of Example 9 was obtained.

Comparative Example 1

Commercially available copper foil was used without alteration, as the current collector of Comparative Example 1.

Comparative Example 2

The current collector of Comparative Example 2 was obtained in a manner similar to Example 1, except that the paste in which copper particles and PVDF were mixed was not applied between the two sheets of copper foil that extended from the edge of the resin sheet to the external side.

With respect to the current collector obtained in Examples 1 to 9 and Comparative Example 2, the total thickness of the two sheets of metal foil (two metal layers) in the thickest portion of the resin-laminated part, and the thickness of the metal-laminated part are shown in Table 1.

Fabrication of Lithium Ion Secondary Battery for Evaluation $LiNi_{1/3}Co_{1/3}Mn_{1/3}O_2$ (LNCM) as a positive electrode active material, AB as a conductive material, and polyvinylidene fluoride (PVDF) as a binding agent were mixed together at a mass ratio of LNCM:AB:PVDF=88:9:3 with N-methylpyrollidone (NMP) using a planetary mixer, to prepare positive electrode mixture paste. At the time of preparation, the solid content concentration of the positive electrode mixture paste was adjusted to 56 mass %. The positive electrode mixture paste was applied in a band shape onto both sides of a long aluminum foil, using a die coater, and then dried. The resultant was pressed to produce the positive electrode sheet.

A negative electrode active material in which silicon oxide powder and graphite were mixed was prepared. This negative electrode active material, SBR as a binding agent, and CMC as a thickening agent, were mixed together at a mass ratio of the active material:SBR:CMC=84:8:8 with ion-exchange water, using a planetary mixer, to prepare negative electrode mixture paste. At the time of preparation, the solid content concentration of the negative electrode mixture paste was adjusted to 66 mass %. Th negative electrode mixture paste was applied in a band shape onto both sides of the current collector of each Examples and each Comparative Examples, using a die coater, and then dried. The resultant was pressed to produce the negative electrode sheet.

In addition, as a separator, a sheet was prepared with a heat-resistant layer (HRL) arranged on a porous polyolefin sheet having a three-layer structure of PP/PE/PP. The positive electrode sheet and negative electrode sheet fabricated as mentioned above, and two separator sheets prepared as mentioned above were laminated to fabricate the electrode body.

Next, a positive electrode terminal and a negative electrode terminal were connected to the electrode body, and this was housed in a battery case. Next, non-aqueous electrolyte solution was injected into the battery case, and the battery case was sealed in an airtight manner. It should be noted that as the non-aqueous electrolyte solution, a solution was used in which $LiPF_6$ as the supporting salt was dissolved at a concentration of 1.0 mol/L in a mixed solvent containing EC and EMC at a volume ratio of EC:EMC=1:3, and vinylene carbonate was dissolved therein at a concentration of 2 mass %. In this manner, a lithium ion secondary battery for evaluation was obtained.

With respect to each of the obtained lithium ion secondary batteries for evaluation, as activation treatment, constant-current charging was performed in an environment at a temperature of 25° C., at a current value of ⅓ C, until the voltage reached 4.2 V, after which constant-voltage charging was performed until the current reached 1/50 C, so that the batteries became fully charged. Thereafter, constant-current discharging was performed at a current value of ⅓ C, until the voltage reached 3.0 V.

Current Collector Strength Measurement

The current collector of each Example and each Comparative Example was fixed to a test plate of a tensile strength tester. An attachment of the tensile strength tester was fitted to the tip of the current collector, and a tensile load was applied to the current collector in a direction at 180° to the test plate until the current collector ruptured, and the tensile strength was thereby measured. Taking the tensile strength of the current collector of Comparative Example 1 to be 1, the ratio of the tensile strength of the current collector of each of Examples and the other Comparative Example relative to Comparative Example 1 was determined. The results are shown in Table 1.

Evaluation of Cycle Characteristics

At the time of electrical discharging in the activation treatment of each lithium ion secondary battery for evaluation, the capacity was measured, and taken to be the initial capacity. Each lithium ion secondary battery for evaluation with which activation treatment had been performed was placed in an environment at a temperature of 25° C., and subjected to 500 cycles of electric charging and discharging, with each cycle involving constant-current charging up to 4.2 V at 1 C, and constant-current discharging up to 3.3 V at 1 C. After completion of 500 cycles, the electrical discharging capacity was determined by the same method as the initial capacity. As an index of cycle characteristics, the capacity retention rate (%) was determined from the following formula: (Electrical discharging capacity after 500 cycles of electric charging and discharging/initial capacity)× 100. The results are shown in Table 1.

Evaluation of Internal Short Circuit Resistance

After constant-current charging of each lithium ion secondary battery for evaluation at a current value of ⅓ C until the voltage reached 4.2 V, constant-voltage charging was performed until the current reached 1/10 C. In an environment at a temperature of 25° C., a thermocouple was fitted to the battery case of each lithium ion secondary battery for evaluation. A nail made of iron with a diameter of about 3 mm was thrust near the center of each lithium ion secondary battery for evaluation, at a speed of 10 mm/s, and allowed to penetrate the battery so as to cause an internal short circuit. The external surface temperature of the battery was measured using a thermocouple, and the maximum temperature reached was determined. The internal short circuit resistance of each lithium ion secondary battery for evaluation was evaluated on the basis of the following criteria:

A: Maximum temperature reached less than 150° C.

B: Maximum temperature reached at least 150° C. and less than 200° C.

C: Maximum temperature reached at least 200° C. and less than 250° C.

D: Maximum temperature reached at least 250° C. and less than 300° C.

E: Maximum temperature reached at least 300° C.

Evaluation of Low-Temperature Resistance

The activated lithium ion secondary batteries for evaluation of Comparative Example 1 and Examples 3 and 9 were adjusted to 3.70 V, and then placed in an environment at −5° C. Electrical discharging was performed for 25 seconds at a current value of 3 C with each lithium ion secondary battery for evaluation, and at that time the amount of change in voltage (ΔV) was obtained, and the battery resistance was calculated from the current value and ΔV. Taking the low-temperature resistance of the lithium ion secondary battery for evaluation of Comparative Example 1 to be 1, the ratio of the resistance values of the lithium ion secondary batteries for evaluation of Examples 3 and 9 relative to Comparative Example 1 were determined. The results are shown in Table 1.

TABLE 1

|  | Total thickness of metal foils in resin-laminated part (μm) | Thickness of metal-laminated part (μm) | Metal particles in resin layer | Capacity retention rate (%) | Internal short circuit resistance | Tensile strength ratio | Low-temperature resistance ratio |
|---|---|---|---|---|---|---|---|
| Comparative Example 1 | 4 | 4 | Absent | 31.25 | E | 1 | 1.00 |
| Comparative Example 2 | 4 | 3.5 | Absent | 25.20 | E | 0.88 | — |
| Example 1 | 4 | 4.5 | Absent | 40.30 | B | 1.42 | — |
| Example 2 | 4 | 5 | Absent | 41.33 | B | 2.16 | — |
| Example 3 | 4 | 7 | Absent | 40.92 | B | 3.15 | 0.66 |
| Example 4 | 6 | 7 | Absent | 41.01 | C | 3.83 | — |
| Example 5 | 5 | 7 | Absent | 40.03 | B | 3.43 | — |
| Example 6 | 3 | 7 | Absent | 41.20 | A | 2.84 | — |
| Example 7 | 2 | 7 | Absent | 40.99 | A | 2.53 | — |
| Example 8 | 1 | 7 | Absent | 41.01 | A | 2.14 | — |
| Example 9 | 4 | 7 | Present | 40.95 | B | 3.16 | 0.50 |

By comparing each Example and each Comparative Example, it can be seen that, by increasing the thickness of the metal-laminated part to greater than the total thickness of the first metal layer and second metal layer in the thickest portion of the resin-laminated part, capacity decrease can be suppressed, and heat generation when an internal short circuit occurs can be strongly suppressed. In addition, by comparing Examples 3 to 8, it can be seen that when the total thickness of the first metal layer and second metal layer in the resin-laminated part is 3 μm or less, heat generation when an internal short circuit occurs can be more strongly suppressed. In addition, by comparing Examples 3 and 9, it can be seen that by including metal particles in the resin layer, low-temperature resistance characteristics can be improved.

From the above, it can be seen that, according to the secondary battery current collector disclosed herein, excellent cycle characteristics and internal short circuit resistance can be imparted to the secondary battery.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A manufacturing method for a secondary battery current collector, the method comprising the steps of:

preparing a resin sheet and two sheets of metal foil;

sandwiching the resin sheet between the two sheets of metal foil, and placing metal particles between the two sheets of metal foil at end parts of the two sheets of metal foil; and performing resistance-welding of the two sheets of metal foil in a portion where the metal particles have been placed.

2. The manufacturing method according to claim 1, wherein the resin sheet contains the metal particles; and in the step of placing the metal particles, placement of the metal particles is implemented by sandwiching the resin sheet between the two sheets of metal foil.

* * * * *